US009232410B2

(12) United States Patent
Syu et al.

(10) Patent No.: US 9,232,410 B2
(45) Date of Patent: Jan. 5, 2016

(54) ZERO-CONFIGURATION SYSTEM AND METHOD FOR NETWORK DEVICES

(71) Applicant: D-Link Corporation, Taipei (TW)

(72) Inventors: Sheng-Jie Syu, Taipei (TW); Pai-Huan Wang, Taipei (TW); Chiao-Yu Yang, Taipei (TW)

(73) Assignee: D-LINK CORPORATION, Taipei (TW)

( * ) Notice: Subject to any disclaimer, the term of this patent is extended or adjusted under 35 U.S.C. 154(b) by 511 days.

(21) Appl. No.: 13/655,709

(22) Filed: Oct. 19, 2012

(65) Prior Publication Data

US 2014/0040443 A1 Feb. 6, 2014

(30) Foreign Application Priority Data

Aug. 6, 2012 (TW) .............................. 101128215 A

(51) Int. Cl.
*G06F 15/177* (2006.01)
*H04W 24/02* (2009.01)
*H04W 84/12* (2009.01)
*H04W 88/08* (2009.01)

(52) U.S. Cl.
CPC .............. *H04W 24/02* (2013.01); *H04W 84/12* (2013.01); *H04W 88/08* (2013.01)

(58) Field of Classification Search
CPC ................................. G06Q 10/10; G06F 9/441

USPC .................... 709/220; 713/1, 193; 705/72, 30
See application file for complete search history.

(56) References Cited

U.S. PATENT DOCUMENTS

| | | | |
|---|---|---|---|
| 6,789,078 B2 * | 9/2004 | Saitou et al. ..................... 705/72 |
| 2003/0097551 A1 * | 5/2003 | Fuller et al. ........................ 713/1 |
| 2007/0234073 A1 * | 10/2007 | Cromer et al. ................. 713/193 |
| 2008/0077425 A1 * | 3/2008 | Johnson et al. .................... 705/1 |
| 2012/0072316 A1 * | 3/2012 | Baumann ........................ 705/30 |

* cited by examiner

*Primary Examiner* — Joshua Joo
*Assistant Examiner* — Younes Naji
(74) *Attorney, Agent, or Firm* — Bacon & Thomas, PLLC

(57) ABSTRACT

The present invention is a zero-configuration system including a registration server connecting (via the Internet) to a network terminal device through a network connection device, and a first network device located in a local area network same as the two devices and having a first identification name and a set of configuration values, wherein the registration server stores the first identification name corresponding to a user information. The network terminal device can login to the registration server by using the user information, and then scan the local area network and, when detecting a second network device having a second identification name not yet stored in the registration server, automatically receive the first identification name from the registration server, obtain the configuration values from the first network device, and configure the second network device according to the configuration values, so as to automatically connect to and access the second network device.

8 Claims, 5 Drawing Sheets

ZERO-CONFIGURATION SYSTEM AND METHOD FOR NETWORK DEVICES

FIELD OF THE INVENTION

The present invention relates to a network system, more particularly to a zero-configuration system for enabling a network terminal device to login to a registration server through the Internet by using a user information, and then scan a local area network thereof and, when detecting a second network device having a second identification name not yet stored in the registration server, automatically receive a first identification name of a first network device located in the same local area network from the registration server, obtain a set of configuration values from the first network device, and configure the second network device according to the configuration values, so as to automatically connect to and access the second network device. Thus, once the first network device is configured in advance, the network terminal device can use the configuration values of the first network device to configure the second network device, thereby effectively prevents network devices from malfunctioning which may otherwise result from wrong configurations.

BACKGROUND OF THE INVENTION

A network router, also known as a bandwidth sharing device and hereinafter also referred to as a router for short, is a network connection device located at the junction of two or more networks and configured to connect at least two networks. A router provides routing by forwarding data packets to their destinations through the networks it connects. With the prevalence of broadband Internet access, more and more people have routers installed in their homes or offices, with at least one network terminal device (e.g., a personal computer) connected to each router. A network terminal device connected to a router can connect to the Internet through the router in order to access resources in the Internet or use Internet services offered by Internet service providers. In addition to wired routers, wireless routers are now commercially available so that a user may connect such network devices as network printers and webcams to a wireless router using Wi-Fi or other wireless technologies, thereby establishing a local area network in which the user can access the network printers, webcams, and like network devices through a network terminal device.

Each time a user wishes to install a new network device and add it to an existing local area network, the user must connect the network device to the network router either by a physical network cable or wirelessly and, following the user manual of the network device, manually configure the network device to be added to the local area network. For example, the user is required to input a variety of parameters including a Service Set identifier (SSID) and a device password. During the configuration process, the user must input the parameters correctly in order for the network device to function properly.

However, based on years of practical experience in the network technology-related fields and after long-term research and observation, the inventor of the present invention has found that it is by no means easy for an ordinary user to correctly configure a new network device in a local area network and enable a network terminal device in the local area network to access this new network device. Most people would have problem configuring a network device and are often faced with unexpected difficulties resulting from a lack of professional knowledge in network configuration. Despite that a network device can function properly only if the required parameters are correctly input, one who is unfamiliar with the way of configuration is very likely to input the parameters wrongly. Should that happen, not only will the wrong configuration prevent the network device from proper operation, but also the user's time will have been wasted.

Therefore, the issue to be addressed by the present invention is to solve the various problems facing one who wishes to add a network device to a local area network. It is desirable that a pre-configured network device can be used to configure a subsequently added network device, thereby simplifying and speeding up the installation of this network device, reducing the time required for configuration, and preventing any erroneous configuration.

BRIEF SUMMARY OF THE INVENTION

In view of the aforesaid problems generally encountered when installing a network device, the inventor of the present invention conducted extensive research and experiment and finally succeeded in developing a zero-configuration system and method for network devices, wherein a pre-configured network device is used to rapidly configure a subsequently added network device. Thus, the time required for configuration is significantly reduced, and the newly added network device is prevented from malfunctioning which may otherwise result from a wrong configuration.

It is an object of the present invention to provide a zero-configuration system for network devices. The system includes a network terminal device, a network connection device, a registration server, and a first network device. Both the network terminal device (e.g., a computer) and the network connection device (e.g., a network router) are located in a local area network. The network terminal device can connect to the registration server through the Internet by way of the network connection device. The first network device (e.g., a network printer) is located in the local area network. The first network device has a first identification name and a set of configuration values. The registration server stores at least one entry of user information (e.g., a username and a user password) and the first identification name, wherein the user information corresponds to the first identification name. The network terminal device can log in to the registration server using the user information that corresponds to the first identification name and then scan the local area network. The network terminal device, when detecting a second network device (e.g., a webcam) in the local area network and determining that the second network device has a second identification name that is not stored in the registration server, automatically receives from the registration server the first identification name corresponding to the user information used for logging in to the registration server, obtains the set of configuration values from the first network device according to the first identification name, and configures the second network device according to the set of configuration values, so as to automatically connect to and access the second network device within the local area network. The network terminal device also transmits the second identification name of the second network device to the registration server, instructs the registration server to store the second identification name, and makes the second identification name correspond to the user information used for logging in to the registration server. Therefore, once the first network device is configured in advance, the user can use the configuration values of the first network device to configure the second network device by way of the network terminal device. This not only substantially simplifies the installation of network devices, but also substantially reduces the time required for configuration.

More importantly, the system effectively prevents wrong configurations and thereby effectively prevents network devices from malfunctioning which may otherwise result from wrong configurations.

Another object of the present invention is to provide a zero-configuration method for network devices, wherein the method is applicable to a system including a network terminal device, a network connection device, a registration server, and a first network device. The network terminal device, the network connection device, and the first network device are all located in a local area network. The first network device has a first identification name and a set of configuration values. The registration server stores at least one entry of user information username and a user password) and the first identification name, wherein the user information corresponds to the first identification name. The method is carried as follows. The network terminal device is connected to the registration server via the Internet by way of the network connection device and logs in to the registration server using the user information that corresponds to the first identification name. After that, the network terminal device scans the local area network. When detecting a second network device in the local area network and determining that the second network device has a second identification name that is not stored in the registration server, the network terminal device automatically receives from the registration server the first identification name corresponding to the user information used for logging in to the registration server. Based on the first identification name, the network terminal device obtains the set of configuration values from the first network device. Then, the network terminal device configures the second network device according to the set of configuration values, no as to connect to and access the second network device within the local area network. The network terminal device also transmits the second identification name of the second network device to the registration server, instructs the registration server to store the second identification name, and makes the second identification name correspond to the user information used for logging in to the registration server. By virtue of the technical features of the present invention, the second network device is rapidly added to the local area network, and difficulties which may otherwise result from the configuration process are effectively prevented.

Still another object of the present invention is to provide the foregoing system and method, wherein the network terminal device sends out a scanning signal when scanning the local area network. Upon receiving the scanning signal, the second network device transmits the second identification name to the network terminal device.

Yet another object of the present invention is to provide the foregoing system and method, wherein the network terminal device, after scanning the local area network and receiving the second identification name, transmits the second identification name to the registration server to make sure that the second identification name has not been stored in the registration server.

A farther object of the present invention is to provide the foregoing system and method, wherein the network terminal devices randomly generates a device password or receives the device password input, by the user, before assigning the device password to the second network device. This not only simplifies the configuration of network devices, but also increases the security of local area networks.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

The inventor of the present invention has long been engaged in research and development in the network device-related fields. In the process, the inventor has found that, due to a lack of professional knowledge in networking, most people tend to encounter problems beyond their capabilities when trying to add a newly bought network device to an existing local area network, and attempts to solve these problems without professional help often end up as a waste of time. Should the wrong parameters be input or other erroneous configurations be made during the configuration process, the network device in question will not function properly. Although efforts have been made to address the aforesaid shortcomings, an ideal solution has yet to be found. In consideration of this, the inventor came up with the idea of taking advantage of the configuration values of an already configured network device. These configuration values can be used to automatically and rapidly configure a subsequently added network device, thus substantially reducing the difficulty of adding a new network device, facilitating the configuration of this new network device, and preventing it from malfunctioning which may otherwise result from a wrong configuration.

Figure 1:
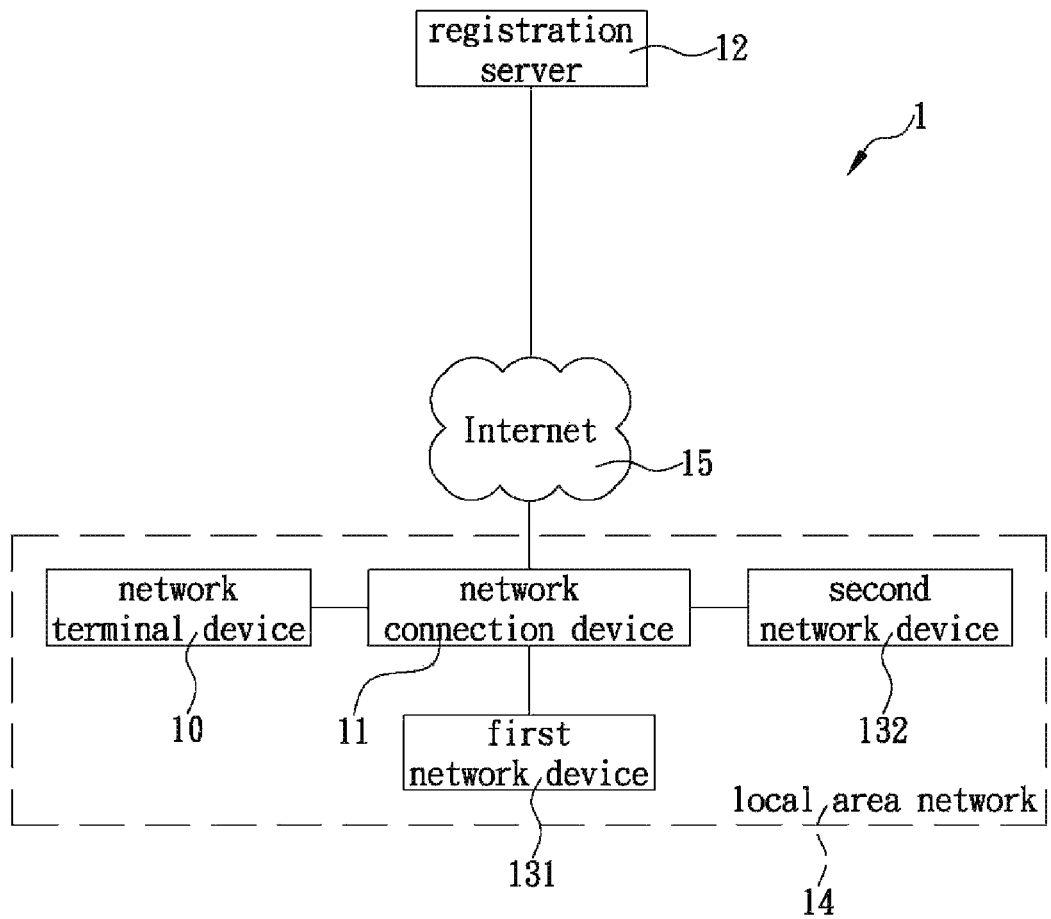
FIG. 1 is a structural diagram of the system according to a preferred embodiment of the present invention.

The present invention discloses a zero-configuration system and method for network devices. Referring to FIG. 1, the system 1 includes a network terminal device 10, a network connection device 11, a registration server 12, and a first network device 131, wherein both the network terminal device 10 and the network connection device 11 are located in a local area network 14. The network terminal device 10 can connect to the registration server 12 through the Internet 15 by way of the network connection device 11. In this preferred embodiment, the network terminal device 10 is a personal computer, and the network connection device 11 is a network router; however, the present invention is not limited to such an arrangement. When implementing the present invention, the network terminal device 10 may be a laptop computer or other personal terminals, and the network connection device 11 may be a network modem or other devices. In other words, the present invention imposes no limitations on the types of the network terminal device 10 and of the network connection device 11. All changes and modifications easily conceivable by a person skilled in the art should fall within the scope of the present invention.

The first network device 131, which is also located in the local area network 14, has a first identification name and a set of configuration values. The first network device 131 may be a network printer, a webcam, or the like. In addition, the first network device 131 may be connected to the network connection device 11 either by a physical network cable or wirelessly via Wi-Fi). The network terminal device 10 can connect to and access the first network device 131 within the local area network 14 according to the first identification name and the set of configuration values. The first identification name may be a MAC address (Media Access Control Address) or other names whereby the first network device 131 can be identified. The configuration values of the first network device 131 may be a Service Set Identifier (SSID) or like parameters. Nonetheless, the first identification name and the configuration values are by no means limited to the examples given above. In the present preferred embodiment, the first network device 131 is a webcam whose first identification name is "CAM-001" and whose configuration values are "mySSID".

The registration server 12 stores at least one entry of user information and the first identification name "CAM-001". The one of the at least one entry of user informal on that is to be used herein by the network terminal device 10 (hereinafter referred to as the user information) includes a username and a user password and corresponds to the first identification name. In other words, the first identification name "CAM-001" is bound to the user information. The network terminal device 10 can log in to the registration server 12 using the user information. It should be pointed out that the user information and the first identification name of the first network device 131 are stored into the registration server 12 when the first network device 131 is added to the local area network 14 for the first time. More specifically, the user connects the network terminal device 10 to the registration server 12 and registers the user information and the first identification name with the registration server 12 in order for the registration server 12 to store the same. Different users are supposed to log in to the registration server 12 using their respective user information, and the different user information may be bound with different identification names (e.g., of a webcam).

Figure 2:
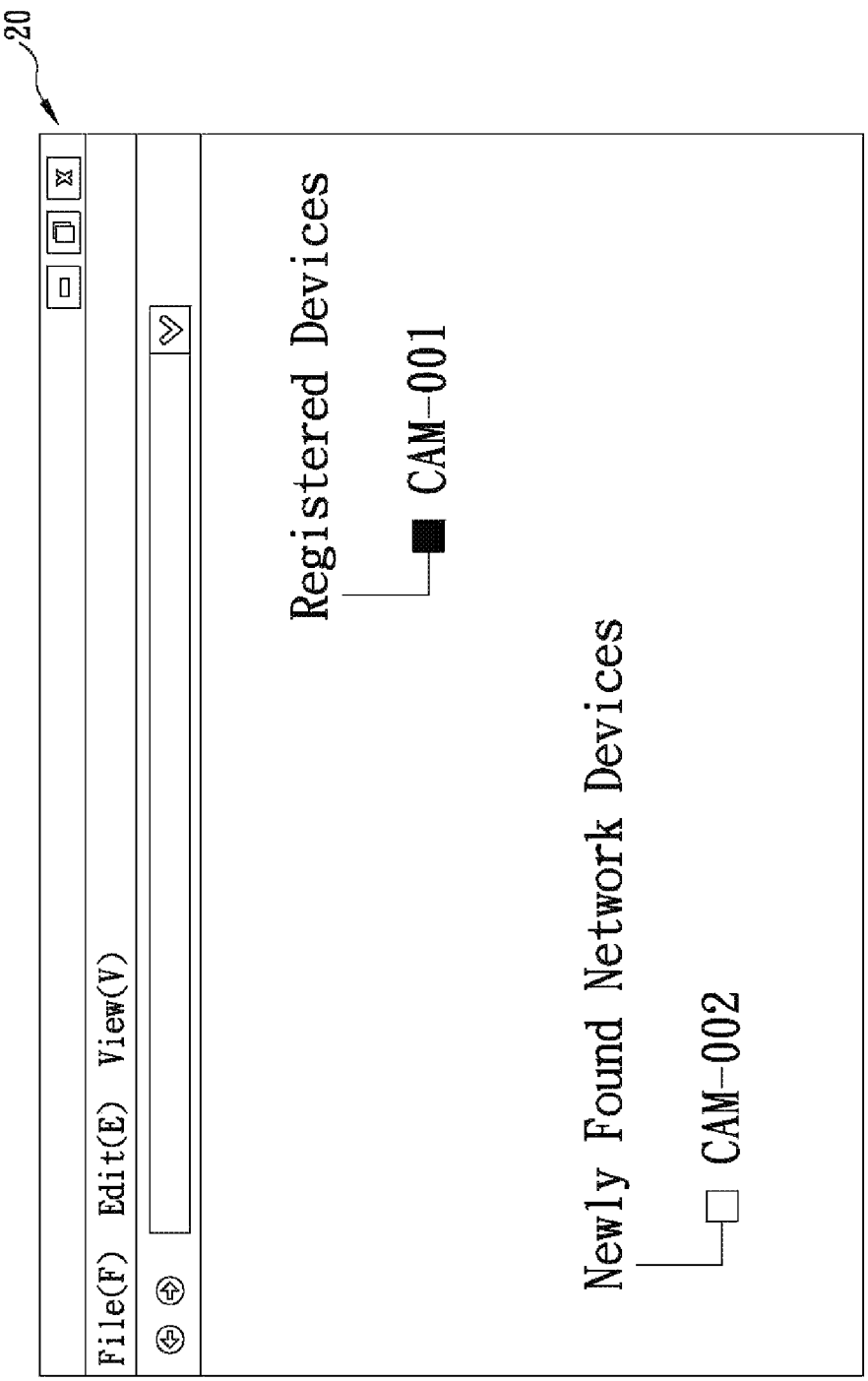
FIG. 2 schematically shows how the network terminal device in the present invention executes an embedded web application through a web browser.

Referring again to FIG. 1, the network terminal device 10 scans the local area network 14 after logging in to the registration server 12. In practice, the registration server 12 may use an embedded web application (as shown in FIG. 2) which, after the network terminal device 10 logs in to the registration server 12 by means of a web browser 20, is automatically executed by the network terminal device 10 to scan the local area network 14 and perform subsequent procedures. The second network device 132 is another webcam and is the network device that the user wishes to add. The second network device 132 has a second identification name "CAM-002". When scanning the local area network 14, the network terminal device 10 sends out a scanning signal. The second network device 132 receives the scanning signal and, in response, transmits the second identification name "CAM-002" to the network terminal device 10. Referring to FIG. 2, once the network terminal device 10 receives the second identification name "CAM-002", the web browser 20 shows the newly found network device: "CAM-002", and the network terminal device 10 transmits the second identification name to the registration server 12 to make sure that the second identification name has not been stored in the registration server 12. Since the second network device 132 is a new device, the second identification name "CAM-002", as may be expected, is not stored in the registration server 12. Upon determining that the second identification name has yet to be stored into the registration server 12, the network terminal device 10 automatically receives from the registration server 12 the first identification name "CAM-001" corresponding to the user information (i.e., the first identification name "CAM-001" already registered with and stored in the registration server 12) and shows the registered device: "CAM-001" in the web browser 20. According to the first identification name "CAM-001", the network terminal device 10 obtains the configuration values "mySSID" from the first network device 131.

Figure 3:
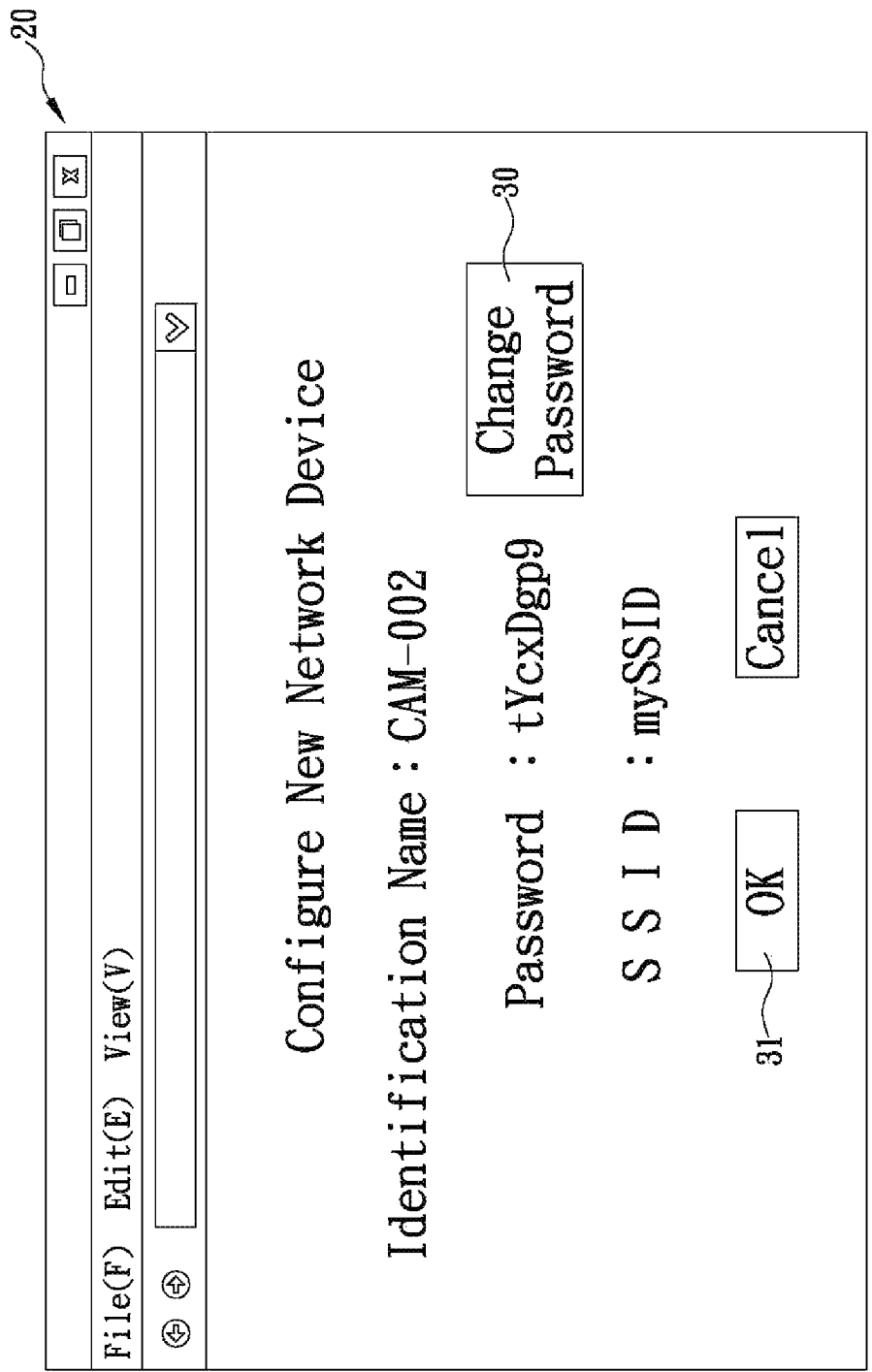
FIG. 3 is another schematic drawing showing how the network terminal device in the present invention executes an embedded web application through a web browser.
Figure 4:
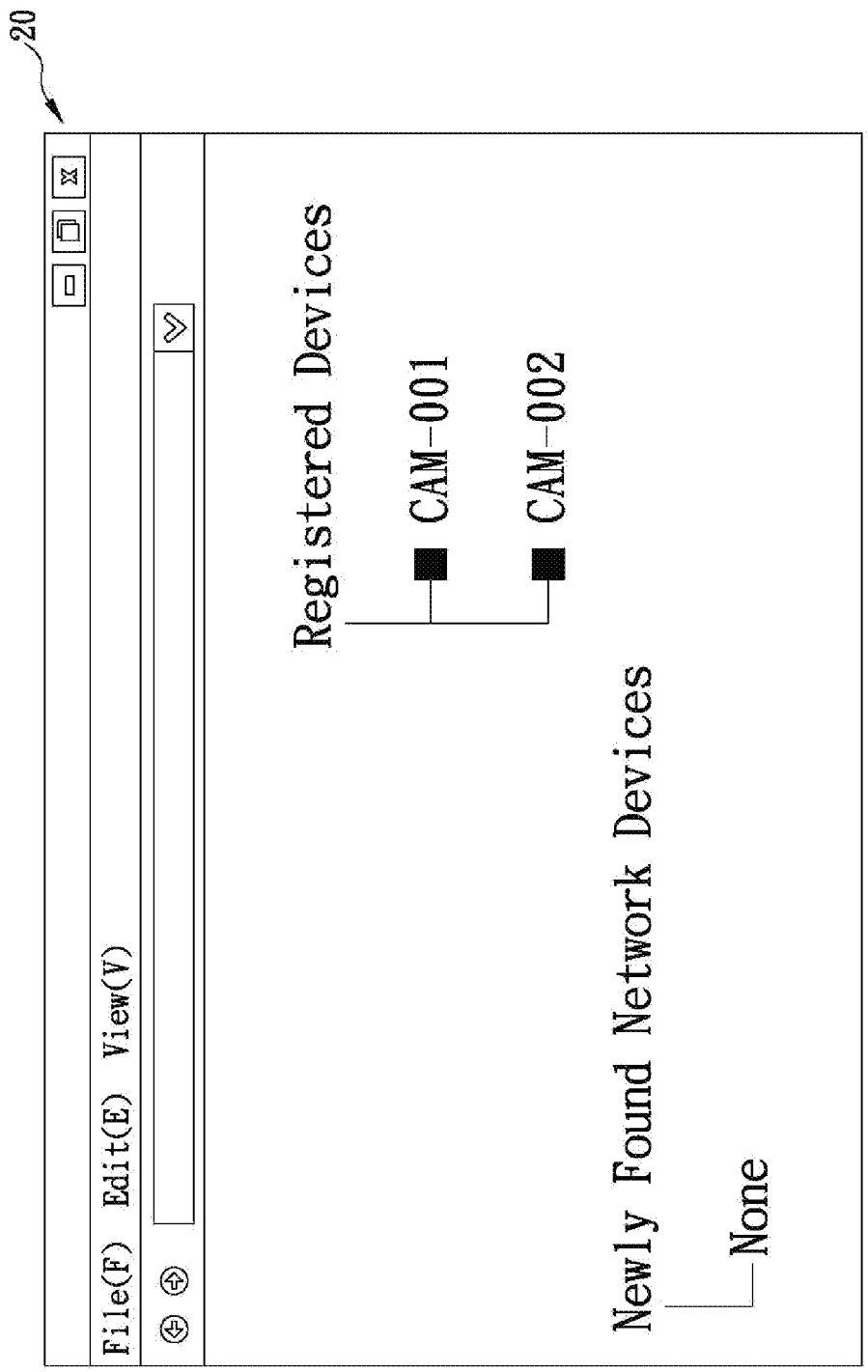
FIG. 4 is yet another schematic drawing showing how the network terminal device in the present invention executes an embedded web application through a web browser.
Figure 5:
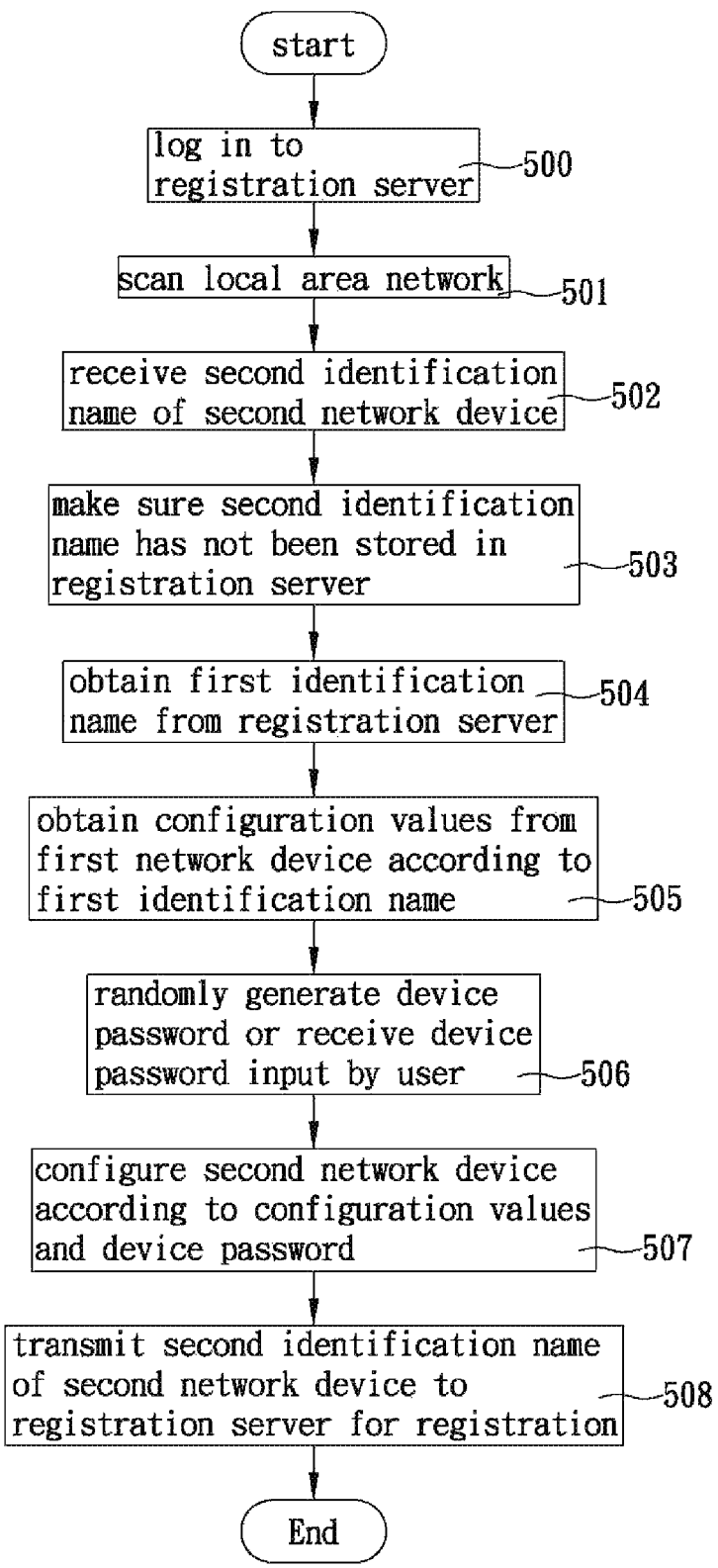
FIG. 5 is the flowchart of the configuration method of the present invention.

Referring to FIGS. 1 and 3, when the user selects the second identification name "CAM-002" shown in FIG. 2, the network terminal device 10 displays a preset page in the web browser 20 that shows the second identification name "CAM-002". Besides, when executing the aforesaid embedded web application, the network terminal device 10 either randomly generates a device password "tYcxDgp9" or generates a prompting interface for receiving the device password input by the user. In FIG. 3, the screen image of the network terminal device 10 also includes a "Change Password" button 30 by which the user can set the device password as desired. After the user clicks on the "OK" button 31, referring back to FIG. 1, the network terminal device 10 configures the second network device 132 according to the set of configuration values "mySSID" and the device password "tYcxDgp9". Thus, the network terminal device 10 will be able to automatically connect to and access the second network device 132 within the local area network 14. To control or manage the second network device 132 (e.g., to change the default hardware/software configuration values), however, the network terminal device 10 must pass device password authentication. The network terminal device 10 also transmits the second identification name "CAM-002" of the second network device 132 to the registration server 12, instructs the registration server 12 to store the second identification name "CAM-002", and makes the second identification name "CAM-002" correspond to the user information (see FIG. 4), thereby binding the second identification name to the user information.

Therefore, if the user has configured a network device (e.g., the first network device 131) in advance and wishes to add a new network device (e.g., the second network device 132) to the existing local area network 14, the second network device 132 can be automatically configured via the network terminal device 10 according to the configuration values of the pre-configured first network device 131, without the user having to resort to the conventional way of configuring a network device that is to be added to an existing local area network by inputting various parameters). Thus, the installation of network devices is significantly simplified. The zero-configuration system and method of the present invention allow those who lack professional knowledge in networking to complete the installation of the second network device 132 easily and rapidly. As the time required for configuration is substantially reduced, work efficiency is increased. The present invention also keeps users from making wrong configurations, thereby effectively preventing network devices from malfunctioning which may otherwise result from wrong configurations.

To facilitate understanding of the steps of the method disclosed herein, the configuration method of the present invention is now detailed in a step-by-step manner with reference to the accompanying drawings. Referring to FIGS. 1 through 5, the configuration method of the present invention includes the following steps:

(500) The network terminal device 10 is connected to the registration server 12 through the Internet 15 by way of the network connection device 11 and logs in to the registration server 12 using the user information.

(501) The network terminal device 10 sends out a scanning signal to scan the local area network 14.

(502) The network terminal device 10 receives the second identification name "CAM-002" fed back from the second network device 132.

(503) The network terminal device 10 transmits the second identification name to the registration server 12 to make sure that the second identification name has not been stored in the registration server 12.

(504) The network terminal device 10 automatically receives from the registration server 12 the first identification name "CAM-001" corresponding to the user information.

(505) The network terminal device 10 obtains the set of configuration values (e.g., the SSID value of "mySSID") from the first network device 131 according to the first identification name.

(506) The network terminal device 10 randomly generates a device password (e.g., "tYcxDgp9") or receives the device password input by the user.

(507) The network terminal device 10 configures the second terminal device 132 according to the set of configuration values and the device password, so as to connect to and access the second network device 132 within the local area network 14.

(508) The network terminal device 10 transmits the second identification name "CAM-002" of the second network device 132 to the registration server 12, instructs the registration server 12 to store the second identification name "CAM-002", and makes the second identification name "CAM-002" correspond to the user information.

It should be pointed out that the aforesaid technical features of sending out a scanning signal to scan the local area network 14 and setting the device password are but the preferred steps of the present invention. A person skilled in the art may change the way the local area network 14 is scanned or omit the step of setting the device password (though at the risk of compromised security) according to product design requirements; nevertheless, the intended effects of the present invention are equally achievable. All changes and modifications readily conceivable by a person skilled in the art should be viewed as equivalent changes to the present invention and fall within the scope of the appended claims.

What is claimed is:

1. A zero-configuration system for network devices, comprising:
    a network connection device located in a local area network;
    a first network device located in the local area network and connected to the network connection device, wherein the first network device has a first identification name and a set of configuration values stored therein;
    a registration server located outside the local area network, connected to the network connection device and storing at least one entry of user information and the first identification name, wherein the user information corresponds to the first identification name; and
    a network terminal device located in the local area network and connected to the network connection device, wherein the network terminal device:
        connects to the registration server by way of the network connection device through the Internet;
        logs in to the registration server using the user information that corresponds to the first identification name;
        scans the local area network by sending out a scanning signal;
        when a second network device receives the scanning signal and transmits a second identification name to the network terminal device, transmits the second identification name to the registration server to determine whether the second identification name has not been stored in the registration server;
        automatically obtains from the registration server the first identification name corresponding to the entry of user information, upon determining that the second identification name has not yet been stored in the registration server;
        obtains the set of configuration values from the first network device according to the first identification name; and
        configures the second network device according to the set of configuration values, so as to automatically connect to and access the second network device within the local area network according to the second identification name and the set of configuration values.

2. The system of claim 1, wherein the network terminal device transmits the second identification name to the registration server, instructs the registration server to store the second identification name, and makes the second identification name correspond to the entry of user information used for logging in to the registration server.

3. The system of claim 2, wherein the network terminal device can automatically and randomly generates a device password and assigns the device password to the second network device so that the network terminal device controls or manages the second network device after passing authentication of the device password.

4. The system of claim 2, wherein the network terminal device receives a device password input by a user and assigns the device password to the second network device so that the network terminal device controls or manages the second network device after passing authentication of the device password.

5. A zero-configuration method for network devices, the method being applicable to a network terminal device within a local area network and comprising the steps, performed by the network terminal device, of:
    connecting to a registration server located outside the local area network through the Internet by way of a network connection device located in the local area network, and logging in to the registration server using user information, wherein the registration server stores the user information and a first identification name, the user information corresponds to the first identification name, and the first identification name is an identification name of a first network device located in the local area network;
    sending out a scanning signal for scanning the local area network and, when receiving a second identification name fed back from a second network device located in the local area network, transmitting the second identification name to the registration server, so as to determine whether the second identification name has not been stored in the registration server;
    reading automatically from the registration server the first identification name corresponding to the user information, upon determining that the second identification name has not yet been stored in the registration server;
    obtaining a set of configuration values from the first network device according to the first identification name; and
    configuring the second network device according to the set of configuration values, so as to connect to and access the second network device within the local area network according to the second identification name and the set of configuration values.

6. The method of claim 5, further comprising the steps, performed by the network terminal device, of: transmitting the second identification name to the registration server, instructing the registration server to store the second identification name, and making the second identification name correspond to the user information.

7. The method of claim 6, further comprising the steps, performed by the network terminal device, of: generating randomly a device password, and assigning the device password to the second network device so that the network terminal device controls or manages the second network device after passing authentication of the device password.

8. The method of claim 6, further comprising the steps, performed by the network terminal device, of: receiving a device password input by a user, and assigning the device password to the second network device so that the network terminal device controls or manages the second network device after passing authentication of the device password.

* * * * *